United States Patent [19]
Ho et al.

[11] Patent Number: 5,793,123
[45] Date of Patent: Aug. 11, 1998

[54] ELECTRONIC DEVICE WITH TWO POWER SUPPLY MODES

[75] Inventors: Wai Keung Ho, Aberdeen, Hong Kong; Michel Grossier, Gagny; Jacques Mingot, Noisy le Roi, both of France

[73] Assignee: Thomson Multimedia S.A., Courbevoie, France

[21] Appl. No.: 492,576

[22] Filed: Jun. 20, 1995

[30] Foreign Application Priority Data

Jun. 28, 1994 [FR] France ................... 94 08049

[51] Int. Cl.$^6$ ........................... H02J 9/04
[52] U.S. Cl. ............... 307/66; 307/64; 307/70; 307/80; 320/2; 361/625; 363/81
[58] Field of Search ............ 307/66, 64, 70, 307/75, 71, 72, 74, 80, 81, 85; 320/2; 323/229, 285; 327/320; 361/625; 363/37, 74, 81

[56] References Cited

U.S. PATENT DOCUMENTS

| | | | |
|---|---|---|---|
| 3,267,288 | 8/1966 | Maiden | 307/66 |
| 3,790,810 | 2/1974 | Rogers et al. | 307/66 |
| 4,395,639 | 7/1983 | Bring | 307/66 |
| 4,672,293 | 6/1987 | Crampton | 320/14 |
| 5,019,767 | 5/1991 | Shirai et al. | 320/2 |
| 5,159,256 | 10/1992 | Mattinger et al. | 320/2 |
| 5,177,426 | 1/1993 | Nakanishi et al. | 320/13 |
| 5,336,977 | 8/1994 | Li | 315/159 |

FOREIGN PATENT DOCUMENTS

| | | | |
|---|---|---|---|
| 0 077 531 | 4/1983 | European Pat. Off. | H02J 7/34 |
| 41 06 557 A1 | 9/1992 | Germany | H04B 1/20 |
| A-57203 | 3/1983 | Japan | C06F 29/00 |
| 2 162 706 | 2/1986 | United Kingdom | H02J 9/06 |
| WO 87/02848 | 3/1987 | WIPO | H04B 1/034 |

OTHER PUBLICATIONS

Search report—France.

*Primary Examiner*—Richard T. Elms
*Assistant Examiner*—Albert W. Paladini
*Attorney, Agent, or Firm*—Joseph S. Tripoli; Frederick A. Wein

[57] ABSTRACT

The disclosure concerns an electronic device, for example a radio-alarm clock, that can be powered from the mains power supply or from batteries and can operate without interruption when changing from one of these power supplies to the other. It comprises a support connected to the mains and a mobile part that can be placed in electrical contact with said support and that includes at least one electronic circuit requiring power. This electronic circuit is powered from the mains via a first diode when said mobile part is placed in electrical contact with said support, and is powered by at least one battery via a second diode when said mobile part is removed from said support.

12 Claims, 2 Drawing Sheets

ELECTRONIC DEVICE WITH TWO POWER SUPPLY MODES

BACKGROUND OF THE INVENTION

The present invention concerns an electronic device with two modes of electrical power supply, the power supply of the device remaining uninterrupted during change-over from one supply mode to the other. The invention concerns, In particular and as an example, an audio device such as a radio-alarm clock that can be used on the mains power supply in a fixed location, or as a portable device— and without interruption of the sound when changing from one power supply to the other.

Among known radio-alarm clocks, some are mains-only (and therefore static); others are fitted with batteries. The latter may be transported while in operation, but their autonomy is limited by the capacity of the batteries which must be periodically replaced or re-charged.

SUMMARY OF THE INVENTION

The object of the present invention is an electronic device that can be mobile (drawing its power from batteries) or static (drawing its power from the mains) and that can operate without interruption when changing from one of these power supplies (for example the mains) to the other (for example the batteries).

The invention proposes an electronic device comprising a support designed to be connected to the mains power supply and a mobile part that can be placed in electrical contact with said support and that includes at least one electronic circuit requiring power, wherein said electronic circuit is powered by a rectified voltage supplied by said support connected to the mains when said mobile part is placed in electrical contact with this support, and is powered by at least one battery when said mobile part is no longer in electrical contact with this support, there being no interruption in the electrical power supply when said mobile part is removed from or placed on said support, in order to assure the continuity of operation of said electronic circuit.

Preferably, a first diode is associated with the electrical mains power supply of the electronic circuit. Similarly, a second diode is associated with the battery power supply of the electronic circuit.

The rectified voltage supplied by the support is advantageously larger than that of the battery of the mobile part, since the second diode is then non-conducting when the mobile part is placed in electrical contact with the support, which protects the battery against a back current.

The invention proposes a simple, low-cost technique, convenient for the user. In the case of a radio-alarm clock for example, after the alarm has sounded the user can move around, carrying with him the mobile part of the device (which contains the electronic circuit of the radio-alarm clock), without interrupting the broadcast he is listening to or losing track of the time.

BRIEF DESCRIPTION OF THE DRAWINGS

The invention will be better understood and other advantages and characteristics will become clear on reading the following description, taken only as an non-limitative example, making reference to the appended figures, of which.

In the embodiment described, the invention is applied to a radio-alarm clock, i.e. a radio receiver including a clock and a radio alarm, but it can be extended to all types of electronic audio and video devices, notably laser disk players, radios, audio cassette players, liquid crystal screens for television, visiophones, etc.

Figure 1:
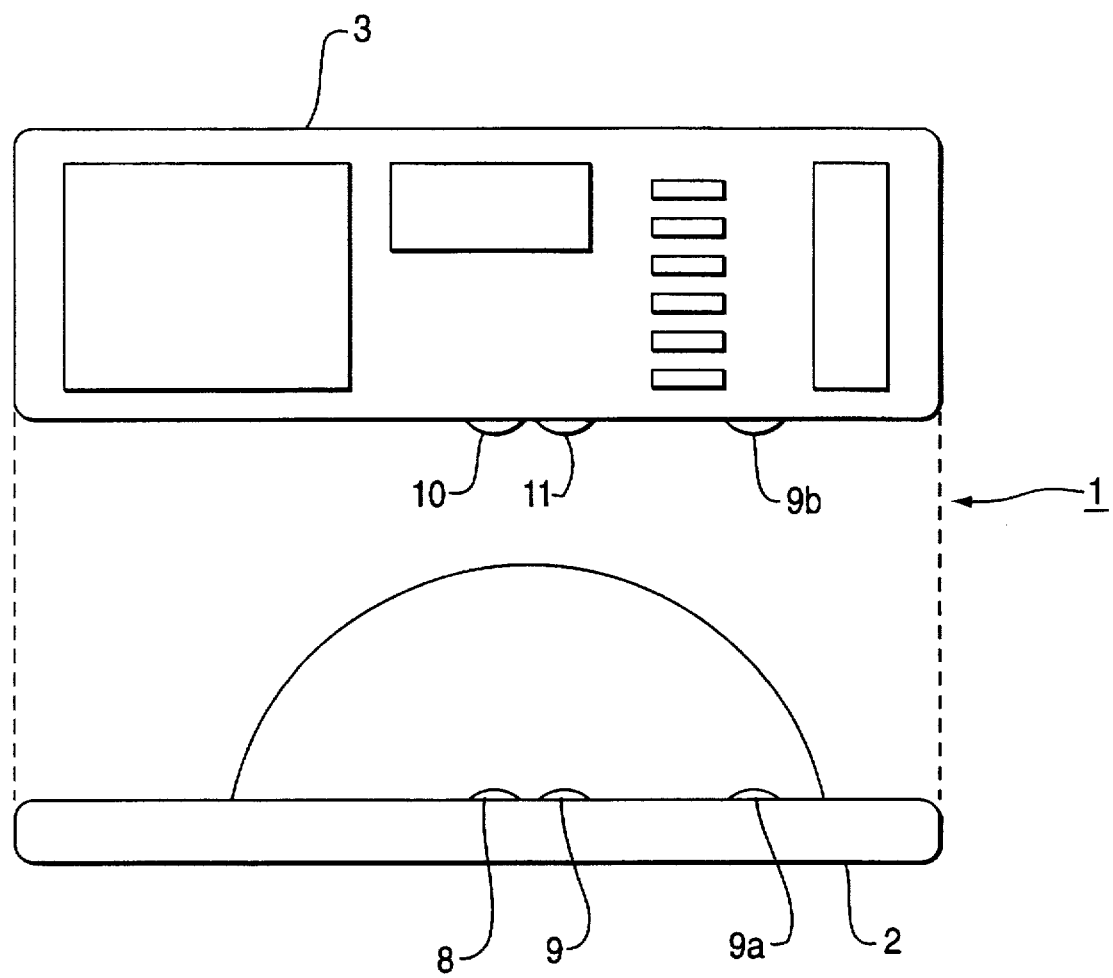
FIG. 1 is a schematic diagram of an electronic device according to the invention.
Figure 2:
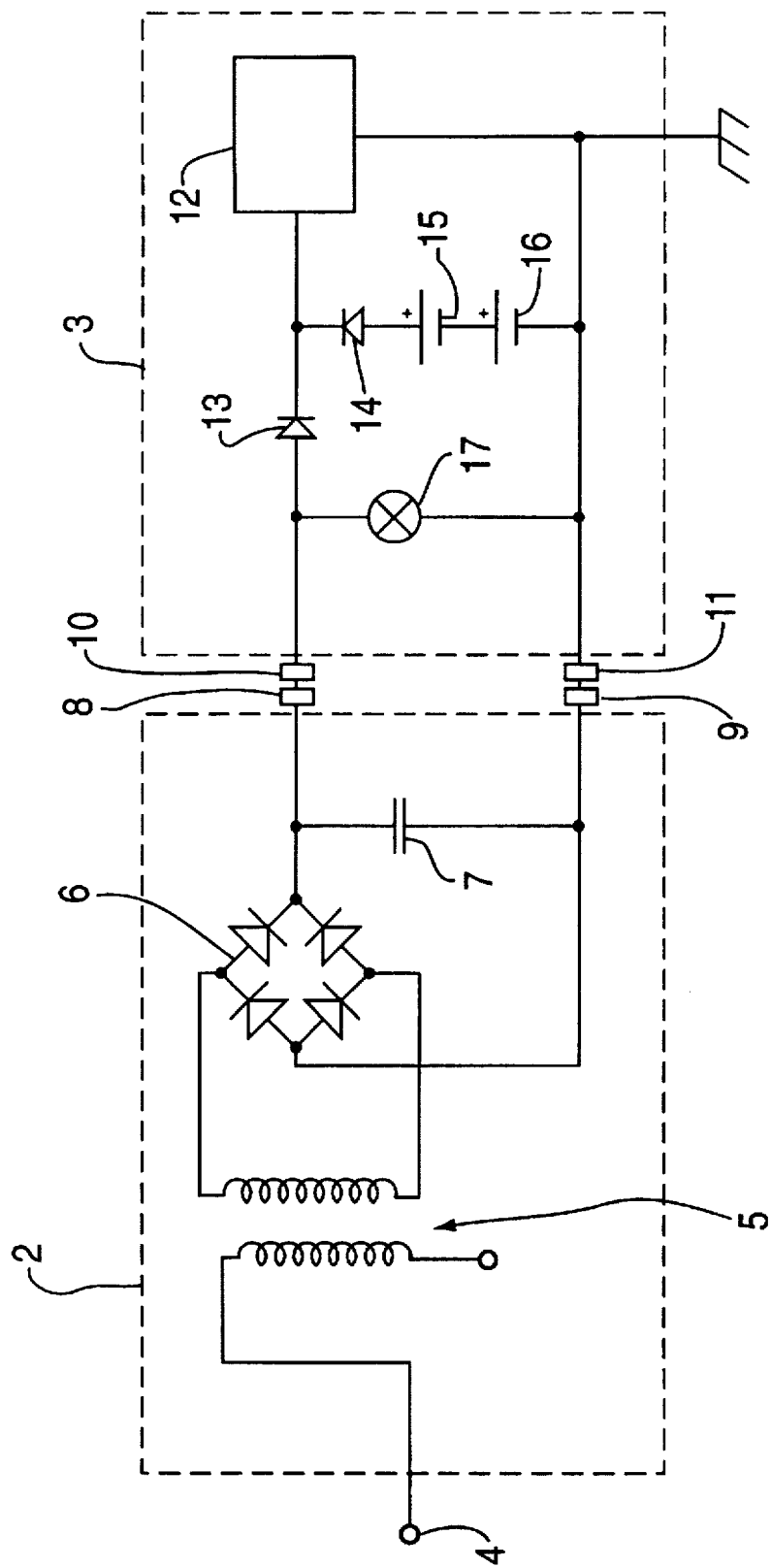
FIG. 2 is a circuit diagram of the electrical power supply system of the device in FIG. 1.

As shown in FIGS. 1 and 2, the radio-alarm clock 1 is composed of two parts, part 2 constituting the base or the support of the device and part 3 constituting its mobile part.

Part 2, the support of the device, includes a mains power supply as shown in FIG. 2. This supply is constituted by an input 4 connected to the mains (not shown) which supplies an AC voltage (e.g. 50 Hz, 230 volts), a transformer 5 used to generate a lower voltage (e.g. 10 volts) which is then rectified in the usual way by a rectifier bridge 6 (for example a diode bridge) and a capacitor 7 connected across the two outputs of the rectifier bridge. One important characteristic of the present invention is that these outputs are constituted by electrically conducting metallic contacts 8 and 9. These contacts can be, for example, in the form of spherical pins slightly protruding from the surface of the support (FIG. 1). A third contact 9a (FIG. 1), of the same type as the contacts 8 and 9, can be connected to an antenna (not shown) fixed to the support 2 in order to improve the operational characteristics of the device when its mobile part 3 is placed on its support, the contact 9a of antenna of the support then being connected to a contact 9b of the mobile part (see FIG. 1).

According to another important characteristic of the present invention, the mobile part 3 includes two electrical contacts 10 and 11 that can be, for example, two flat phosphor-bronze springs that make contact respectively with the pins 8 and 9 of the support 2 when the mobile part 3 is placed on its support 2. The mobile part 3 of the radio-alarm clock includes an electronic circuit 12 providing the usual functions of such clocks: display of the time and the selected radio frequency, and all the adjusting knobs required for its operation. The electronic circuit 12 is connected to the contacts 10 and 11 via a diode 13. In parallel with these two power supply inputs 10 and 11 and downstream from the diode 13, are connected the batteries 15 and 16 controlled by a diode 14. For optimal performance, capacitors can be added in parallel to the diodes of the rectifier bridge 6, and/or in front of the diode 13 connecting the two contacts 10 and 11.

A means of lighting 17 in the form of a lamp, for example, can be fitted between the metallic electrical contacts 10 and 11 to illuminate, for example, the liquid crystal screen of the radio-alarm clock indicating the time (very useful at night) when the mobile part 3 is placed on the support 2. The lamp is extinguished when the mobile part 3 is lifted from the support 2, in order to minimize the drain on the batteries 15, 16.

The antenna contact 9b of the mobile part 3 of the radio-alarm clock 1 can come into contact with the corresponding antenna-contact 9a of the support. This antenna (not shown) could, for example, be wound around the power supply cord.

Other contacts could be added to the device provide other functions, enhancing the functional characteristics of the device when the mobile part 3 is placed on its support 2.

The radio-alarm clock I operates as follows. When the mobile part 3 is placed or fixed on its support 2, the two parts are in electrical contact and the rectified voltage supplied by the support is, for example, 10 volts. This voltage is greater than that supplied by the batteries 15, 16, for example 3×1.5

V. The diode 13 is therefore conducting and the diode 14 is blocked, which prevents a back current to the batteries 15 and 16. When the mobile part 3 is removed from its support 2, it is no longer in electrical contact via this support with the mains power supply; the diode 14 becomes conducting and enables the power supply of the electronic circuit 12 of the mobile part 3. In this way, when this mobile part 3 of the radio-alarm clock is removed from its support 2, it becomes autonomous thanks to the power supply from its own batteries 15, 16. These batteries may be non-rechargeable, or they can be rechargeable, being re-charged by a conventional charging device when the mobile part 3 and is placed on the support 2, thus optimising the energy autonomy of the mobile part of the device.

Owing to the design of this double power supply circuit, the user will notice no parasitic interference during the change-over of the power supply of the device. He can move the mobile part of the radio-alarm clock from room to room without any interference or interruption of the selected radio program.

Furthermore, the support can be fitted with a loud-speaker and/or a radio circuit similar to that in the mobile part and/or other devices.

What is claimed is:

1. An audio and/or video device having a power supply to supply electric power to an electronic circuit of the device, said power supply being in first and second parts, comprising:

the first part disposed in a support connectable to a mains power supply and having an output of a rectified voltage through a first electrically conducting metallic contacts, the second part disposed in a mobile part of the device including said electronic circuit, said second part receiving a battery providing an output voltage lower than the rectified output voltage of said first part, and coupled in series with a current blocking diode to form a series circuit having first and second terminals, said terminals of said series circuit being coupled to a second electrically conducting metallic contacts, said second electrically conducting metallic contacts ensuring electrical continuity with said first electrically conducting metallic contacts of said first part when said mobile part is placed with said support, said first diode of the series circuit being blockable in a non-conducting state to protect the battery against a back current, the electrical circuit being powered by said battery through said first diode when said mobile part is no longer in electrical contact with said support, so that the continuity of operation of the electronic circuit is not disturbed when said mobile part is removed from or supportably placed with said support.

2. The device according to claim 1, wherein a second diode is included to couple the electrical power supply of said electronic circuit provided by the rectified voltage from said support.

3. The device according to claim 2, wherein the rectified voltage is greater than that the output voltage of said battery reverse biasing said first diode in a non-conducting state while said electronic circuit is powered from the mains.

4. The device according to claim 2, wherein said first and second diodes are disposed in said mobile part.

5. The device according to claim 4, wherein said mobile part also includes a means for illumination connected between said metallic terminals providing electrical contact with said support.

6. The device according to claim 1, wherein said support includes an antenna which can be coupled to the electronic circuit when said mobile part is supportably placed with said support.

7. The device according to claim 1, wherein said electronic circuit is dedicated to be at least one of the following devices: liquid crystal video display, laser disk, magnetic tape player, and radio-alarm clock.

8. The device according to claim 1, wherein said battery is re-chargeable from the mains when said mobile part is in electrical contact with said support.

9. The device according to claim 1 wherein the metallic contacts are spherical pins protruding from a surface of the support.

10. The device according to claim 1 wherein the device is a radio receiver.

11. The device of claim 9 wherein said second contacts of said mobile part are made of flat phosphor-bronze springs.

12. A radio receiver having a power supply to supply an electronic circuit of the device, said power supply being in first and second parts, comprising:

the first part disposed in a support connectable to a main and having an output of a rectified voltage through first electrically conducting metallic contacts in the form of spherical pins slightly protruding from a surface of said support, the second part disposed in a mobile part of the device including said electronic circuit, said second part receiving a battery providing an output voltage lower than the rectified output voltage of said first part and coupled in series with a current blocking diode to form a series circuit having first and second terminals, said terminals of said series circuit being coupled to second electrically conducting metallic contacts, said second electrically conducting metallic contacts ensuring electrical continuity with said first electrically conducting metallic contacts of said first part when said mobile part is placed with said support, said diode of the series circuit being blockable in a non-conducting state to protect the battery against a back current, the electrical circuit being powered by said battery through said diode when said mobile part is no longer in electrical contact with said support, so that the continuity of operation of the electronic circuit is not disturbed when said mobile part is removed from or placed with said support.

* * * * *